United States Patent
Haimi-Cohen (10) Patent No.: US 6,760,431 B1
(45) Date of Patent: Jul. 6, 2004

(54) METHODS AND APPARATUS FOR IDENTIFICATION AND USER PROMPTING FOR STORAGE OF FREQUENTLY USED DATA ITEMS

(75) Inventor: Raziel Haimi-Cohen, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/477,974

(22) Filed: Jan. 5, 2000

(51) Int. Cl.[7] .............................. H04M 1/00; H04M 3/00
(52) U.S. Cl. ............................ 379/355.01; 379/355.02; 379/355.09; 379/357.05
(58) Field of Search ...................... 379/355.01–356.01, 379/357.04

(56) References Cited

U.S. PATENT DOCUMENTS

| | | | | |
|---|---|---|---|---|
| 5,267,308 A | * | 11/1993 | Jokinen et al. | ............. 379/354 |
| 5,432,932 A | * | 7/1995 | Chen et al. | |
| 6,243,459 B1 | * | 6/2001 | Cannon et al. | ........ 379/356.01 |
| 6,295,355 B1 | * | 9/2001 | O'Neal et al. | |

FOREIGN PATENT DOCUMENTS

| | | | | |
|---|---|---|---|---|
| JP | 07913634 A | 7/1995 | ............ | H04M/3/42 |
| WO | WO/98/2539 | 6/1998 | ............ | H04M/3/50 |

* cited by examiner

Primary Examiner—Duc Nguyen (57) ABSTRACT

A device which stores frequently used data items in a retrieval list for easy retrieval and use. An example is a telephone operative to identify frequently-dialed telephone numbers and prompt a user to store frequently-dialed numbers in a speed-dial list. When a number is entered in the telephone, the number is compared with a log of stored numbers. Each stored number has an associated usage frequency. If the entered number is present in the log, the usage frequency of the entered number is updated. If the entered number is not present, the entered number is stored along with an initial usage frequency. The usage frequency of the number is compared against a predetermined criterion, and if the criterion is met the user is prompted to store the entered number in an empty space in the speed-dial list, or to replace an already existing entry in the speed-dial list with the entered number. Any of numerous alternatives may be chosen for prompting of the user and storage of the entered number. For example, the user may simply be presented with a decision as to whether to store the entered number. If the user answers affirmatively, the entered number may automatically be stored in the next available space, or if no empty space exists, the entered number may be stored in place of the least frequently used entry in the speed-dial list. Alternatively, menus and choices may be presented to allow the user control over storage of the entered number. If an entered number already exists in the speed-dial list, the user is reminded that the entered number is already present, in order to enhance user awareness of the speed-dial feature.

13 Claims, 8 Drawing Sheets

THE NUMBER (212)867-5309 IS A FREQUENTLY USED NUMBER. WOULD YOU LIKE TO ADD IT TO THE SPEED DIAL LIST?

THE NUMBER (212)867-5309 HAS BEEN ADDED TO THE SPEED DIAL LIST IN POSITION 8.

THE NUMBER (212)867-5309 IS A FREQUENTLY USED NUMBER. THE NUMBER (415)333-8694 IN THE SPEED DIAL POSITION 8 IS LESS FREQUENTLY USED. WOULD YOU LIKE FOR THE NUMBER (212)867-5309 TO REPLACE THE NUMBER (415)333-8694 IN THE SPEED DIAL LIST?

FIG. 3B

```
THE NUMBER (212)867-5309 HAS REPLACEDTHE NUMBER (415)333-8694 AND
NOW OCCUPIES POSITION 8 IN THE SPEED DIAL LIST.
```

FIG. 3C

```
THE NUMBER (212)867-5309 IS A FREQUENTLY USED NUMBER. THE NUMBER
IN THE SPEED DIAL LIST IN POSITION 8 FOR "JOHN DOE" IS LESS
FREQUENTLY USED. WOULD YOU LIKE THE NUMBER (212)867-5309 TO
REPLACE THE NUMBER FOR "JOHN DOE" IN THE SPEED DIAL LIST?
```

FIG. 3D

```
THE NUMBER (212)867-5309 HAS REPLACED THE NUMBER FOR JOHN DOE
IN POSITION 8 IN THE SPEED DIAL LIST.
```

METHODS AND APPARATUS FOR IDENTIFICATION AND USER PROMPTING FOR STORAGE OF FREQUENTLY USED DATA ITEMS

FIELD OF THE INVENTION

The present invention relates generally to improvements in storage and retrieval of data. More particularly, the invention relates to improved methods and apparatus for automation of entry of frequently used data items into a retrieval list, for example, entry of frequently dialed numbers into a telephone speed-dial list.

BACKGROUND OF THE INVENTION

Many devices which employ user-entered data are adapted to store selected data items in a retrieval list for easy retrieval and use. A prominent example of such a devices is a telephone set having a speed-dial feature. The user stores a telephone number in association with an abbreviated code, typically 1 to 3 digits, and then when the user wishes to dial the stored telephone number, the user simply enters the code and the telephone automatically dials the associated telephone number. Alternatively, a telephone number may be associated with a specific speed-dial button, and a user presses one of the speed-dial button in order to dial a desired number associated with the speed-dial button. In a telephone of this type, storage of a telephone number for speed-dialing would also include storing an association with a speed-dial button.

Speed-dialing is particularly valuable in wireless telephony, because wireless telephones are frequently used in automobiles. The speed-dial feature decreases the time and attention required to dial a number, and therefore increases safety by reducing distractions from the task of driving.

Due to limitations in a telephone's memory capacity, and more importantly, limitations in the ability and inclination of a human being to remember a speed-dial list, lists are typically limited to a relatively small number of entries. In order to maximize the efficiency of a list, it is advantageous that the list include the user's most frequently dialed numbers.

In both types of telephones typical of the prior art, the user decides which numbers belong in the speed-dial list, and makes the entries manually. Many users will not monitor the frequency with which they dial particular numbers, and will not make the optimum entries into their speed-dial list. Many users will not use the speed-dial feature, or will simply enter one or two numbers into the list and will let the other entries remain empty, because they will not wish to take the time to note that a particular number is frequently dialed and is therefore a candidate for inclusion in the speed-dial list. The making of speed-dial entries is typically separate from the act of telephoning, and therefore entries are made at a time when the frequency with which a user dials a number is not uppermost on the user's mind. When a user dials a number, he or she is concentrating on dialing the number and then on engaging in the conversation once the call is connected. When a user is making speed-dial entries, he or she is typically not thinking about how frequently a particular number is called relative to another number, but instead is simply thinking about entering a particular number into the list. These drawbacks result in underutilization and sub-optimal utilization of the speed-dial feature.

There exists, therefore, a need in the art for a device which monitors the frequency of usage of entered data items in order to prompt the user to add the data items to a retrieval list. An example of such a device would be a telephone having a speed-dial feature which monitors the frequency with which a user dials a number and prompts the user to enter frequently-dialed numbers into a speed-dial list during the dialing process.

SUMMARY OF THE INVENTION

A telephone according to the present invention stores each number dialed, along with its frequency of use, in a frequency log which need not be accessible to the user. The first time a number is dialed by a user, the number is stored and a frequency count is begun for the number. The frequency count may simply be the total number of times the telephone number has been dialed, or may be the frequency of usage of the telephone number over time. Each time the number is dialed, the frequency count is adjusted to reflect the current usage frequency of the number. After a number has been dialed and the frequency count adjusted, the entered number is checked against the speed-dial list to determine if it is already present in the list. If the number is already present, the user is reminded that the number is in the speed-dial list, in order to heighten user awareness of the list. If the entered number is not already present in the speed-dial list, the frequency count is evaluated against the frequency counts of other numbers in the frequency log and against a predetermined criterion for inclusion in the speed-dial list. If the entered number has been used with sufficient frequency, and there are either empty spaces remaining in the speed-dial list or a space having a number with a lower usage frequency, the user is prompted to add the new number to the speed-dial list. If the number is being considered for replacement of a lower-frequency number, this fact is pointed out to the user and the number to be replaced is identified. The relative frequency of calling may be displayed, and a simple keying arrangement for choosing or rejecting a change may be provided.

An alternative embodiment of the present invention may be seen in a videorecorder adapted for the unattended recording of television broadcasts and other programming. The videorecorder is adapted to receive user inputs describing programming parameters for a broadcast which is to be recorded. The videorecorder evaluates the usage frequency of sets of programming parameters. When a set of programming parameters has a usage frequency which meets a predetermined criterion, the user is prompted to add the set of parameters into a retrieval list for easy retrieval and entry.

A more complete understanding of the present invention, as well as further features and advantages of the invention, will be apparent from the following Detailed Description and the accompanying drawings.

DETAILED DESCRIPTION

Figure 1:
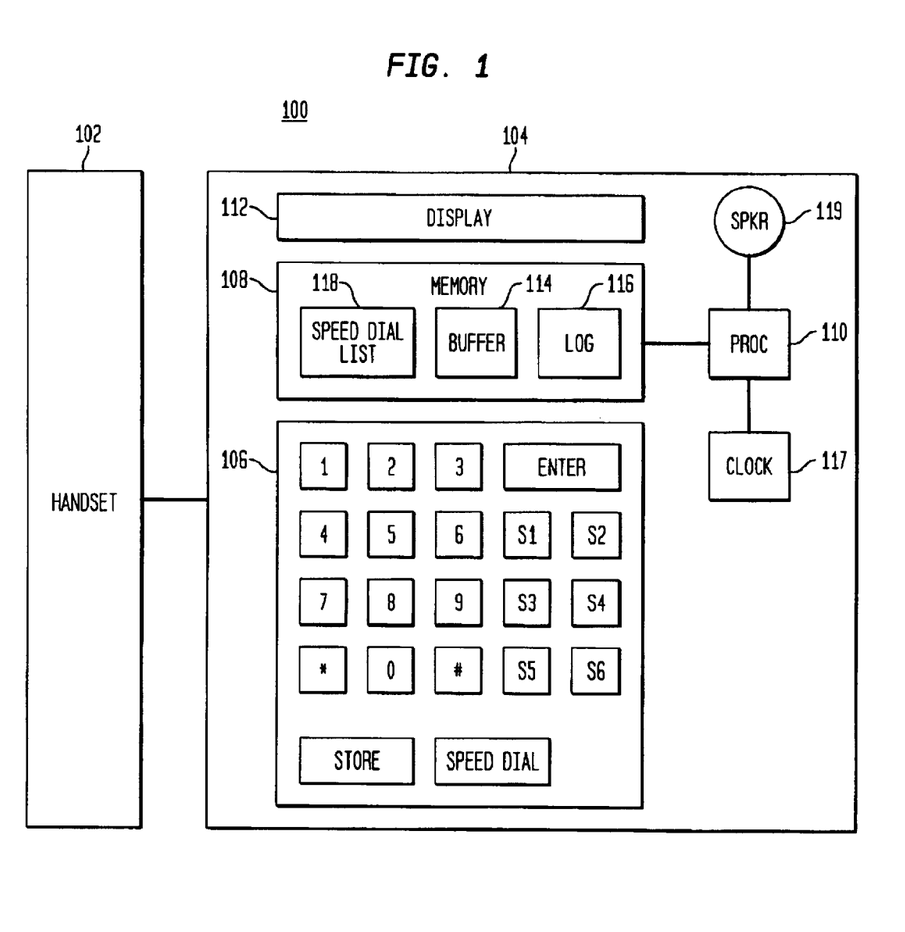
FIG. 1 illustrates a telephone having a speed-dial feature according to the present invention.

FIG. 1 illustrates a telephone 100 having a speed-dial feature according to the present invention. The telephone 100 includes a handset 102 and base 104. The base 104 includes a keypad 106 including number keys for making data entries, a store key for storing a speed-dial entry if the user desires to do so manually, and a speed-dial key for use in speed-dialing a number. The keypad 106 also includes dedicated keys for speed-dialing numbers, allowing some speed-dial entries to be dialed by pressing an associated dedicated key. Other speed-dial entries are dialed by pressing the speed-dial key and then entering an associated numerical code using the number keys. For example, the user may press the speed-dial key and then press "01".

The base 104 includes a memory 108 for data storage and a processor 110 for processing data and executing commands. This processor may be a programmed microprocessor, or more typically will be an application specific integrated component (ASIC). The base 104 further includes a display 112 for displaying data and instructions for a user. The telephone 100 includes a separate handset 102 and base 104, but it will be recognized that the teachings of the present invention may suitably be employed in nearly any telephone configuration, whether the telephone consists of a separate base and handset, a handset only, a wireless handset, a cordless telephone having a keypad in the handset with the base station simply being operative to provide a radio link between the handset and the telephone wireline, or any of myriad other configurations.

When a user wishes to make a call, he or she picks up the handset 102 and dials the telephone number using the keypad 106. As the telephone number is dialed, it is stored in a buffer area 114 of the memory 108. The memory 108 also contains a log 116 of previously entered telephone numbers. The log 116 includes associated data with each number, such as the usage frequency of each number, number of times each number was suggested for inclusion in the speed-dial list 118, and the number of times the user rejected the number for inclusion in the list 118. When the user has finished dialing the telephone number, the processor 110 searches the log 116 to find out if the telephone number is already present in the log 116. If the telephone number is present in the log 116, the processor 110 updates the usage frequency of the number. Depending on design choices, the usage frequency may simply be a total of the number of occasions the telephone number has been dialed, may be a frequency of usage averaged over time, such as three uses per day, one use per week, or the like, or may be a relative frequency computation such as is discussed further below. In a relative frequency computation, entered telephone numbers are identified as candidates for addition to or deletion from the speed-dial list based on their usage frequency as compared to other entered numbers and speed-dial list entries. If the design choice calls for determining usage averages over time, the telephone 100 includes a clock 118 to allow the processor 110 to obtain time information for use in computing usage frequencies. After computing the usage frequency, the processor 110 then compares the usage frequency for the entered telephone number with the numbers in a speed-dial list 118. If the telephone number is already present in the speed-dial list, this may be an indication that the user forgot that the entered number was present in the list. In this case, the processor 110 directs issuance of a reminder prompt while the call is being connected. The reminder prompt may consist of a displayed or issuing a voice-synthesized message, for example "Dialing speed-dial entry 5." Alternatively, if the speed-dial entry is associated with a name or phrase, the reminder prompt may be "Dialing John Doe" or a similar message. The reminder prompt is issued immediately after dialing, so that the user has not forgotten that a manual dialing attempt was made, and it takes place while the user is waiting for a connection and thus does not waste the user's time. The issuance of a reminder prompt helps the user to remember that the speed-dial feature is present and helps raise awareness so that it may be used when appropriate, but does not interfere with the user's operation of the telephone 100.

If the telephone number is not present in the speed-dial list, the processor 110 examines the usage frequency of the telephone number to determine if the usage frequency makes the number a candidate for inclusion in the speed-dial list. The processor 110 also examines data associated with the telephone number to determine if the user has declined to add the number to the speed-dial list 118 more than V times in the past, where V is a predetermined maximum. In that case, the number is not a candidate for inclusion in the speed-dial list, even if the usage frequency would otherwise make it a candidate. If the telephone number is a candidate for inclusion in the speed-dial list, the processor 110 then examines the list to determine if an empty space is available. If a space is available, the processor 110 waits until the call has finished, and then orders a user prompt asking if the user wishes to add the number to the list. An audible prompt such as a beep or a voice synthesized prompt may also be issued using a loudspeaker 119. If the user enters an affirmative response, which may be entered as simply as making a single keystroke, the processor 110 orders the telephone number added to the list and orders display of the telephone number along with its list position. If the user enters a negative response or if a predetermined waiting period elapses with no action, the telephone number is not added to the speed-dial list 118.

A number of alternative design choices may be made to allow the association of several information items with an entered number in the speed-dial list 118. These information items may be used for retrieval or to serve as memory aids. If the telephone 100 employs voice recognition to enter commands or to associate entries in the speed-dial list with names, such as the name of a person to be called, or other words or phrases, the processor 110 may order display of the entered number along with an invitation for the user to speak a name or other word or phrase for association with the entered number. Then, after the user has spoken a desired word or phrase, the processor 110 processes the sound pattern for storage and stores the entered number in association with the sound pattern to allow easy retrieval of the number from the speed-dial list 118. Other alternatives include the storage of a recorded sound, such as name, in association with an entry in the speed-dial list 118. When the entry is retrieved for dialing, the name or other sound is replayed in order to make it easy for the user to confirm that the correct entry is being retrieved and dialed. As another alternative, a text name or other text item may be associated with the speed-dial entry and entered through the use of the keypad 106. On subsequent calls to the same telephone number, the text name or other item may be displayed on the display 112, in order to help confirm to the user that the desired speed-dial entry is being dialed.

If no vacant entries are available in the speed-dial list, the processor 110 compares the usage frequency of the entered telephone number against the usage frequencies of the telephone numbers in the speed-dial list 118. If the usage frequency of the entered telephone number is substantially greater than the usage frequency of the least frequently used telephone number in the list 118, the processor 110 examines the number in the list to determine if it is to be exempt from replacement. A number in the speed-dial list 118 may be exempt for replacement if, for example, it was manually entered into the speed-dial list. A user may enter a number, for example an emergency number, for other reasons than usage frequency. Similarly, a number in the speed-dial list may be exempt from replacement if a user has declined to replace the telephone number more than V times, where V is a predetermined maximum. In that case, the processor 110 examines the number with the next lowest usage frequency to determine if it is a replacement candidate. This process continues until a replacement candidate is found or all the entries in the speed-dial list have been examined and found to be exempt from replacement. If a replacement candidate is found, the processor 110 issues an audible prompt using the loudspeaker 119, displays the entered number and the replacement candidate number, and asks the user if he or she wishes to replace the replacement candidate with the entered number. If the user enters an affirmative response, the processor 110 orders the telephone number added to the list and orders display of the telephone number along with its list position. If the user enters a negative response, the processor simply orders processing of the call and the telephone number is not added to the speed-dial list.

Depending on design choices, any of a number of alternative methods may easily be chosen to notify a user that an entered number may be a candidate for entry in the speed-dial list 118 and to allow the choice of various options associated with storing the entered number in the list 118. For example, in cases where it is desired to replace a presently existing speed-dial list entry with the entered number, the user may be offered a choice of which existing entry to replace. As another example, if the telephone system 100 is designed to employ voice recognition, the opportunity may be offered to associate the entered number with a spoken name or phrase.

Depending on the specific design choices made, for example, design choices relating to the overall cost and complexity of the telephone 100, any of a number of alternative methods may be presented for storage of the entered number in the speed-dial list. For example, it may be desired that the display 112 should be small and simple, suitable for displaying a small data item such as a single telephone number or a short or abbreviated instruction. In that case, the display 112 would show an icon when a candidate number was found, rather than a detailed message. The user would then make keypad entries in order to store the number in the speed-dial list, with the user being assisted through a sequence of keypad entries by a series of prompts.

Alternatively, if the display 112 is to be larger and it is also desired to allow a free range of user choice in locating the entered number within the speed-dial list 118, the user may be notified that an entered number is a candidate for storage in the speed-dial list by an icon or message on the display 118. The presentation of the icon or message would be accompanied by a menu or series of menus which displayed alternatives which could be selected by the user for storage of the entered number, with options as to where within the list to store the number, and with options for selecting numbers for replacement.

If it is desired to employ a telephone with no display, other methods of notifying the user may be employed. For example, the processor 110 may construct a message notifying the user that the entered number is a candidate for storage in the speed-dial list, and may issue an audible alert such as a beeping noise when the user completes the call, and may then deliver the message as a voice prompt, or may store the message as a voice mail message and issue an audible alert to notify the user that the message is present and may be retrieved at leisure from voice mail. Alternatively, when the call is finished, the processor 110 may ring the telephone 100 and, when the user answers, issue appropriate voice prompts to guide the user through the steps of storing the entered number in the speed-dial list.

Figure 2A:
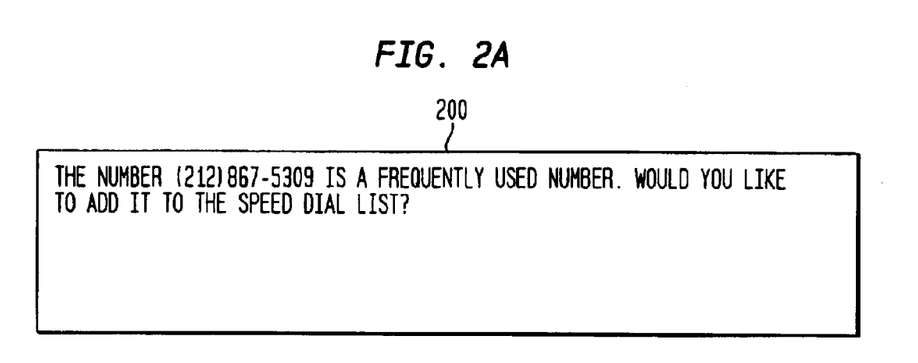
FIG. 2A illustrates a telephone display of a telephone according to the present invention after a telephone number has been entered and determined to be a candidate for entry into an empty position in a speed-dial list.

FIG. 2A illustrates a display 200 of a telephone according to the present invention, after a telephone number has been entered and has been determined to be a candidate for entry into an empty space in the speed-dial list. The display 200 is presenting the entered telephone number, along with an inquiry as to whether it is desired to enter the number into the speed-dial list.

Figure 2B:
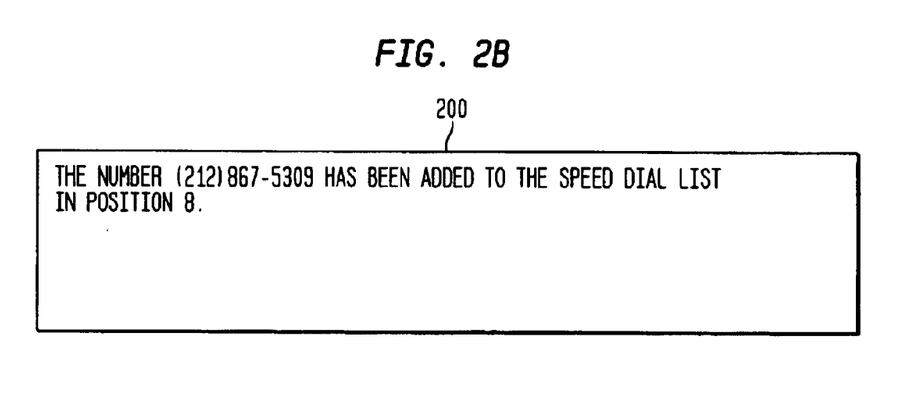
FIG. 2B illustrates a telephone display of a telephone according to the present invention after a telephone number has been saved in an empty position in a speed-dial list.

FIG. 2B illustrates the display 200 after a user has chosen to enter the candidate number into the speed-dial list. The entered telephone number is displayed, along with the list position it occupies.

Figure 3A:
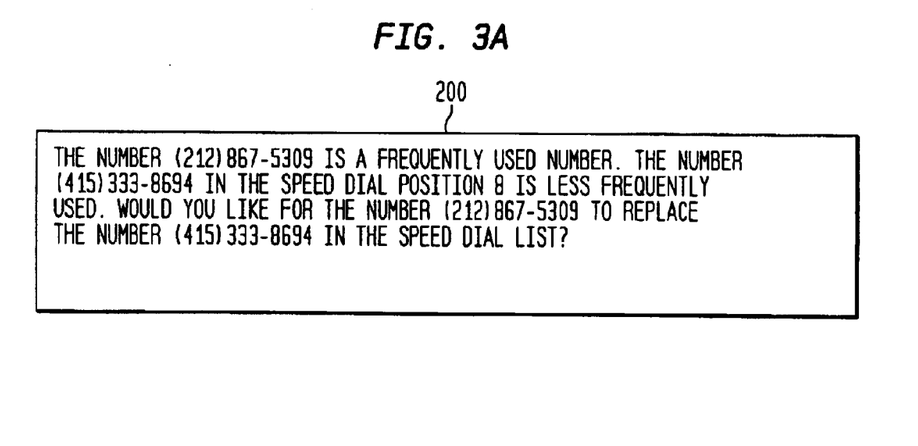
FIG. 3A illustrates a telephone display of a telephone according to the present invention after a telephone number has been entered and determined to be a candidate for entry into an occupied position in a speed-dial list.

FIG. 3A illustrates the display 200 of a telephone according to the present invention, after a telephone number has been entered and has been determined to be a candidate for entry into an occupied space in the speed-dial list. The display 200 is shown here presenting the entered telephone number, along with the telephone number which is a candidate for replacement, and an inquiry as to whether the replacement is desired.

Figure 3B:
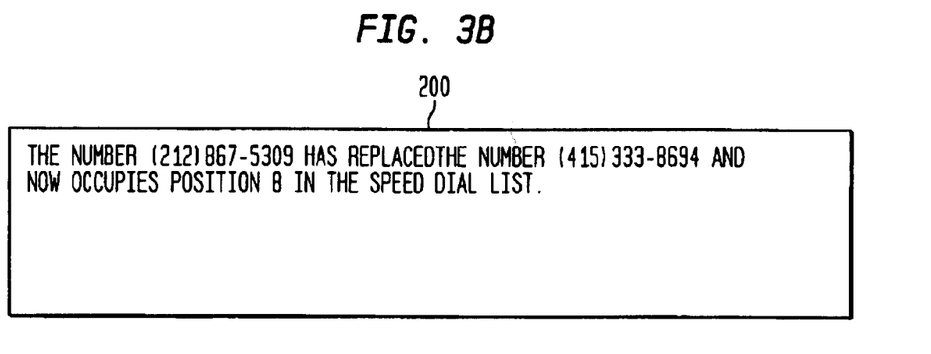
FIG. 3B illustrates a telephone display of a telephone according to the present invention after a telephone number has been saved in an occupied position in a speed-dial list.

FIG. 3B illustrates the display 200 after a user has chosen to make a replacement. The entered telephone number is displayed, along with the list position it occupies and the number which has been replaced.

If additional text information has been associated with the speed-dial entry, it may be used to refer to the speed-dial entry.

Figure 3C:
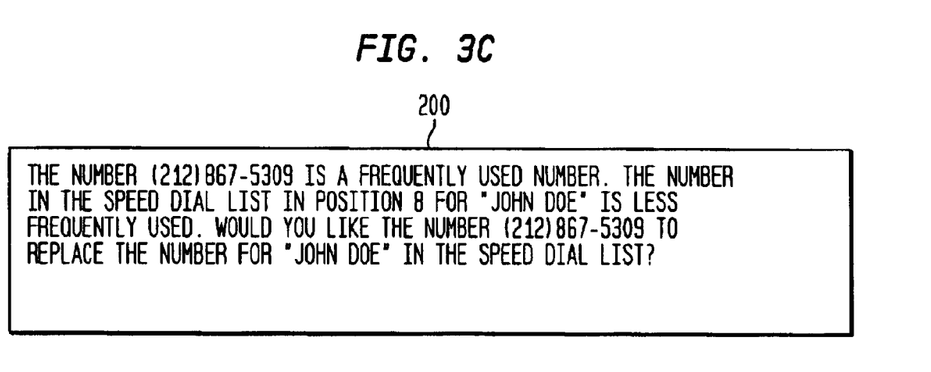
FIG. 3C illustrates a telephone display of a telephone according to the present invention after a telephone number has been determined to be a candidate for inclusion in an occupied position in a speed-dial list in which the speed-dial list position is associated with a text name.

FIG. 3C illustrates the display 200 of a telephone according to the present invention, in which an entry in the speed-dial list is associated with the text name "John Doe". The entered telephone number has been displayed, along with the text associated with the speed-dial list position, and an inquiry as to whether the entered number is to be stored along with the same associated text.

Figure 3D:
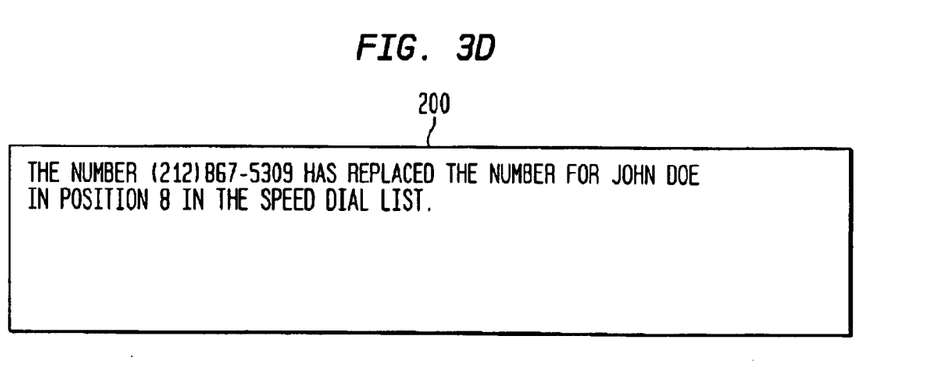
FIG. 3D illustrates a telephone display of a telephone according to the present invention after a telephone number has been saved in an occupied position in a speed-dial list in which the speed-dial list position is associated with a text name.

FIG. 3D illustrates the display 200 after a user has chosen to make a replacement. The entered telephone number is displayed, along with the list position it occupies and the text associated with the list position.

Figure 4:
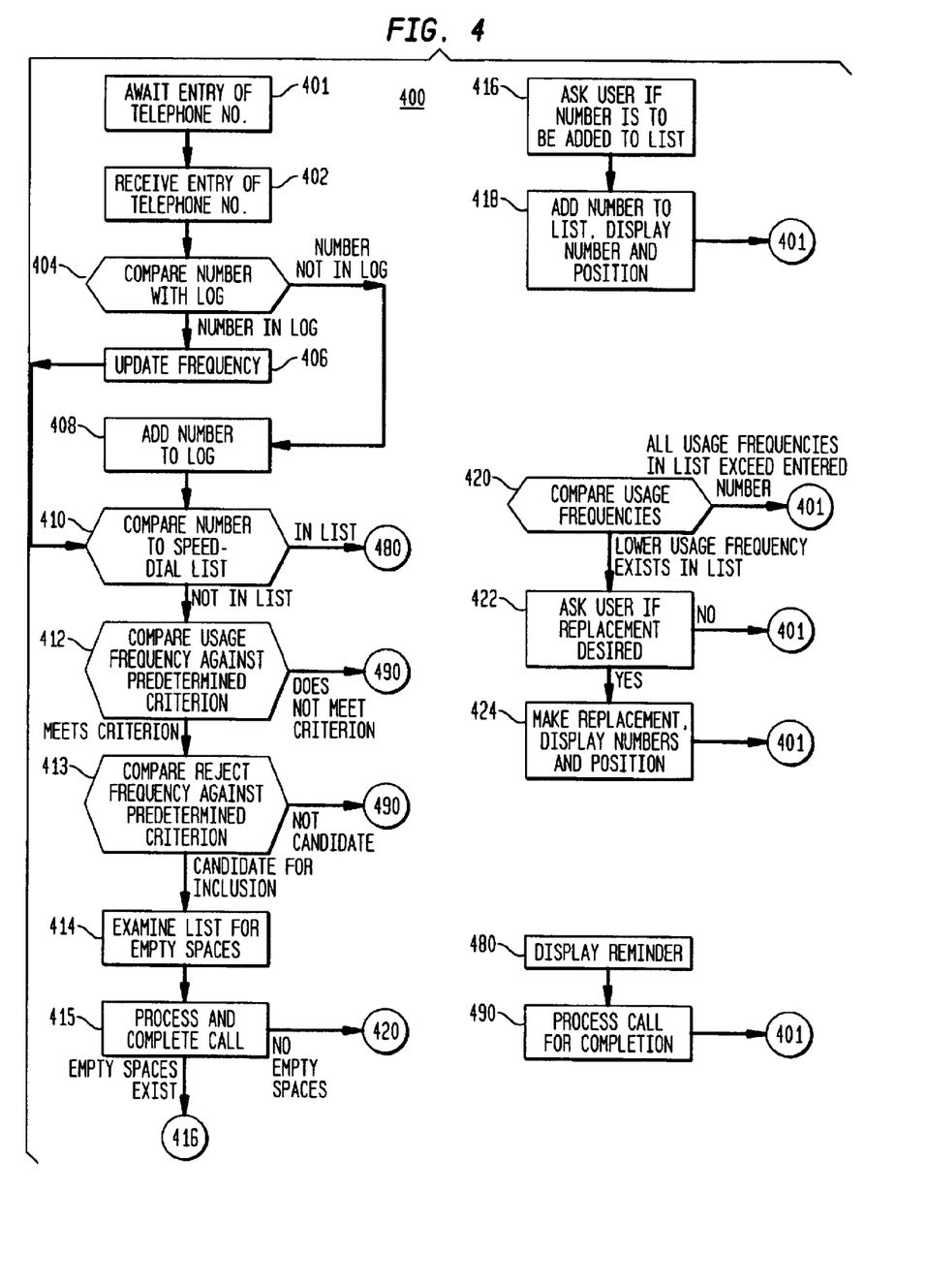
FIG. 4 illustrates a method of identification and storage of frequently used telephone numbers according to the present invention.

FIG. 4 illustrates the steps of a method 400 of storage of frequently dialed telephone numbers according to the present invention. At step 401, a telephone awaits entry of a telephone number. At step 402, entry of a telephone number is received. Next, at step 404, the entered telephone number is compared against a log of previously entered telephone numbers. Each telephone number in the log has an associated usage frequency. If the entered telephone number is in the log, the process continues to step 406 and the usage frequency of the entered number is updated. The process then proceeds to step 410. If the entered telephone number is not in the log, the process skips to step 408 and the entered number is stored in the log, along with its usage frequency. The process then proceeds to step 410. At step 410, the entered number is compared to the speed-dial list. If the entered number is in the speed-dial list, the process continues to step 480 and a reminder message is displayed to remind the user that the entered number is in the speed-dial list. The reminder message may suitably include the entered number and the speed-dial list position of the entered number. The process then continues to step 490 and the telephone call is processed for connection and connection is attempted in a conventional manner. After the call is finished, the process returns to step 401 and the telephone resumes waiting for entry of a number.

If the entered number is not in the speed-dial list, the process continues to step 412 and the usage frequency of the entered number is compared to a predetermined criterion. If the usage frequency meets the criterion, the process continues to step 413 and the entered number is further examined to determine if it is a candidate for inclusion in the speed-dial list. If the usage frequency of the entered number does not meet the predetermined criterion, the entered number is not a candidate for inclusion in the speed-dial list and the process continues to step 490.

At step 413, the log is examined to determine if the entered number has already been rejected for inclusion in the speed-dial list more than a predetermined number of times. If the entered number has not been rejected more than a predetermined number of times, the entered number is a candidate for inclusion and the process continues to step 414. If the entered number has been rejected more than a predetermined number of times, the entered number is not a candidate for inclusion in the speed-dial list and the process continues to step 490.

At step 414, the speed-dial list is examined to determine if any empty spaces exist. Next, at step 415, the call is processed and connection is attempted. When the call is complete, the process continues to step 416 if an empty space exists in the speed-dial list, and to step 420 if no empty spaces exist in the speed-dial list.

At step 416, the user is prompted to decide whether to store the entered number in the speed-dial list. This may be done, for example, by displaying the entered number and asking the user whether he wishes to store the number in the speed-dial list. If the user answers affirmatively, the process continues to step 418. At step 418, the entered number is added to the speed-dial list and the entered number is displayed along with its position in the speed-dial list. The process then returns to step 401 and the telephone resumes waiting for entry of a telephone number.

At step 420, the usage frequency of the entered number is compared with the usage frequencies of the numbers in the speed-dial list. If the usage frequency of the entered number substantially exceeds the usage frequency of one or more of the numbers in the speed-dial list, the least frequently used number in the speed-dial list is a replacement candidate and the process continues to step 422. If no number in the speed-dial list has a usage frequency which is substantially less than the usage frequency of the entered number, the process returns to step 401.

At step 422, the entered number and the replacement candidate are displayed and the user is asked if he or she wishes to replace the replacement candidate with the entered number. If the user answers affirmatively, the process continues to step 424 and the entered number is displayed along with its position in the speed-dial list, and the number which has been replaced is also displayed, together with a notation that replacement has been accomplished. The process then returns to step 401.

FIGS. 5A–5E illustrate an alternative method 500 of identification and storage of frequently dialed telephone numbers according to the present invention. The method 500 employs computation of relative frequencies of numbers to be added to the speed-dial list, and those already present in the speed-dial list, in order to identify candidates for storage and for replacement. At initialization of the method, a telephone set exists having a speed-dial list with S entries, 1,2, . . . ,S. Also present in the telephone set is a log having N entries, N being greater than or equal to S. Log entries are represented as L[1], . . . ,L[N]. Each log entry comprises the following fields:

TEL—a telephone number

CNT—a count associated with the telephone number, the value of CNT ranging from 0 to M. A value of M indicates that the telephone number is frequently used. A value of 0 indicates that the telephone number is rarely used.

SPD—a speed-dial list position associated with TEL. SPD may take on the values 0–S, a value of 0 indicating that TEL does not occupy a speed-dial list position.

DCL—the number of times the user has declined a prompt. If SPD=0, the prompt was to add the number TEL to the speed-dial list. If SPD≠0, the prompt was to remove the number TEL from the speed-dial list. DCL takes on values between 0 to V. A value of V means that the user has declined a prompt a maximum number of times and no further prompts are to be made relating to the log entry. In this discussion, a specific field in a log entry is referred to by appending a period and the field name. For example, L[k].CNT is the CNT field in the log entry k.

At step 502, initialization occurs and all entries in the log list are set to 0. At step 504, the telephone waits for entry of a telephone number by a user. At step 506, in response to a user's dialing of a telephone number, the log is examined and the value CNT is decreased by one for each entry in which TEL is different from the entered telephone number, unless this would cause the value of CNT to be negative, in which case CNT is set to 0. At step 508, the log is examined to determine if the entered telephone number is already present in the log, that is, if a log entry L[k] exists such that TEL is equal to the entered telephone number. If the entered number is not present in the log, the process proceeds to step 556. If the entered number is present in the log, the process continues to step 510 and value of L[k].CNT is increased by A, where A is a design parameter, unless this would cause L[k].CNT to exceed M, in which case L[k].CNT is set to M.

Figure 5A:
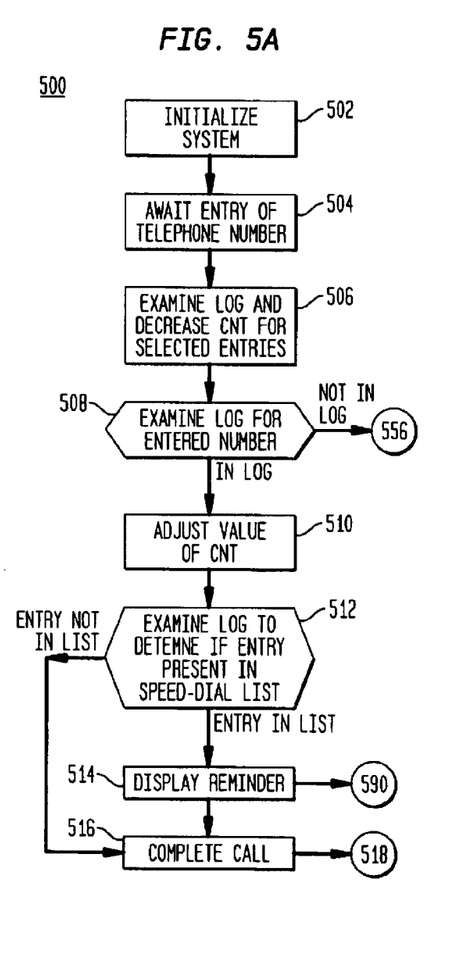
FIGS. 5A–5E illustrate a method of identification and storage of frequently used telephone numbers according to another aspect of the present invention.
Figure 5B:
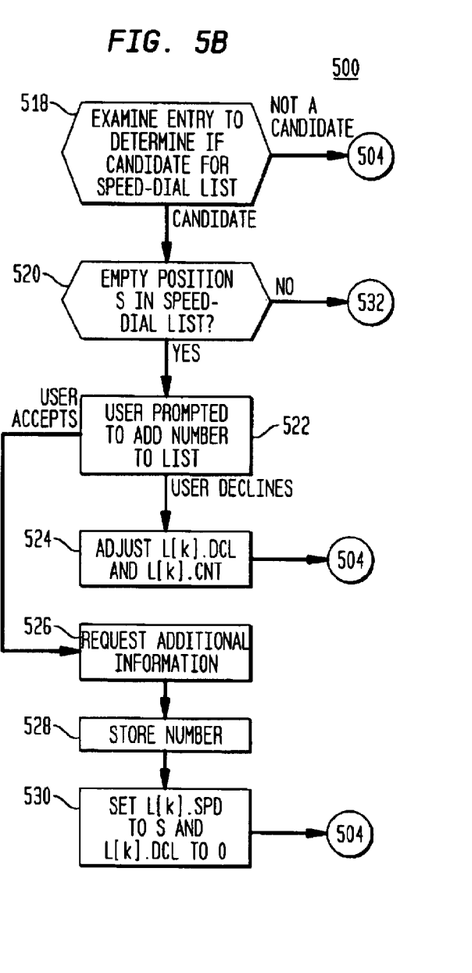
Figure 5C:
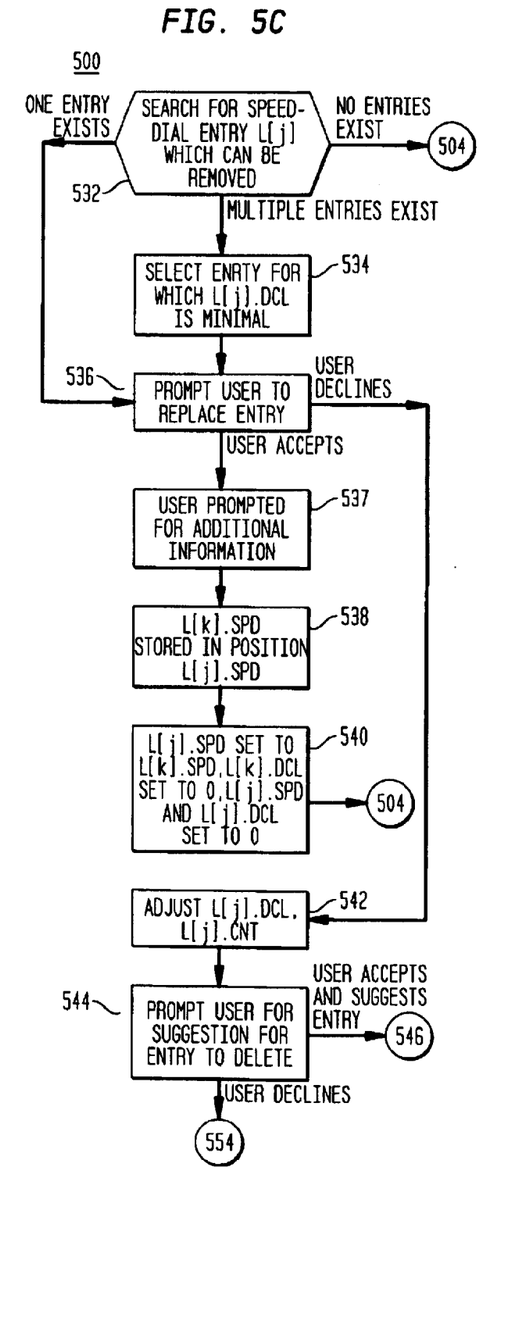
Figure 5D:
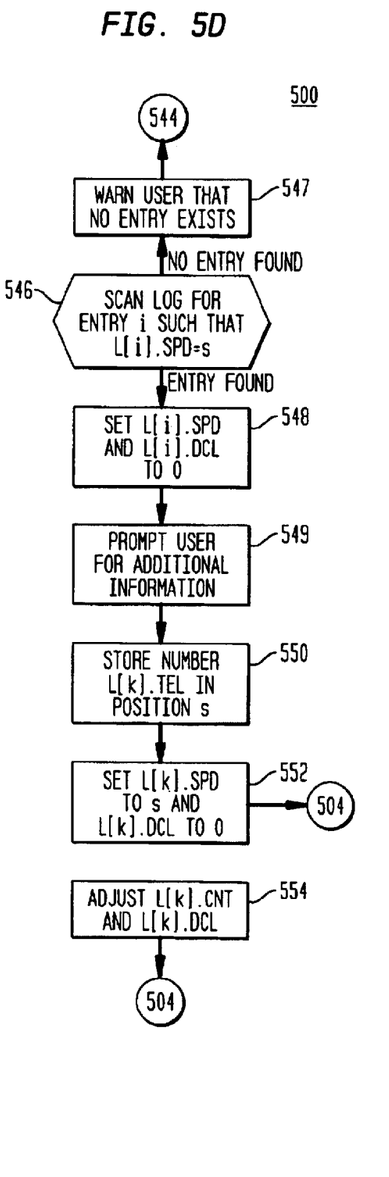
Figure 5E:
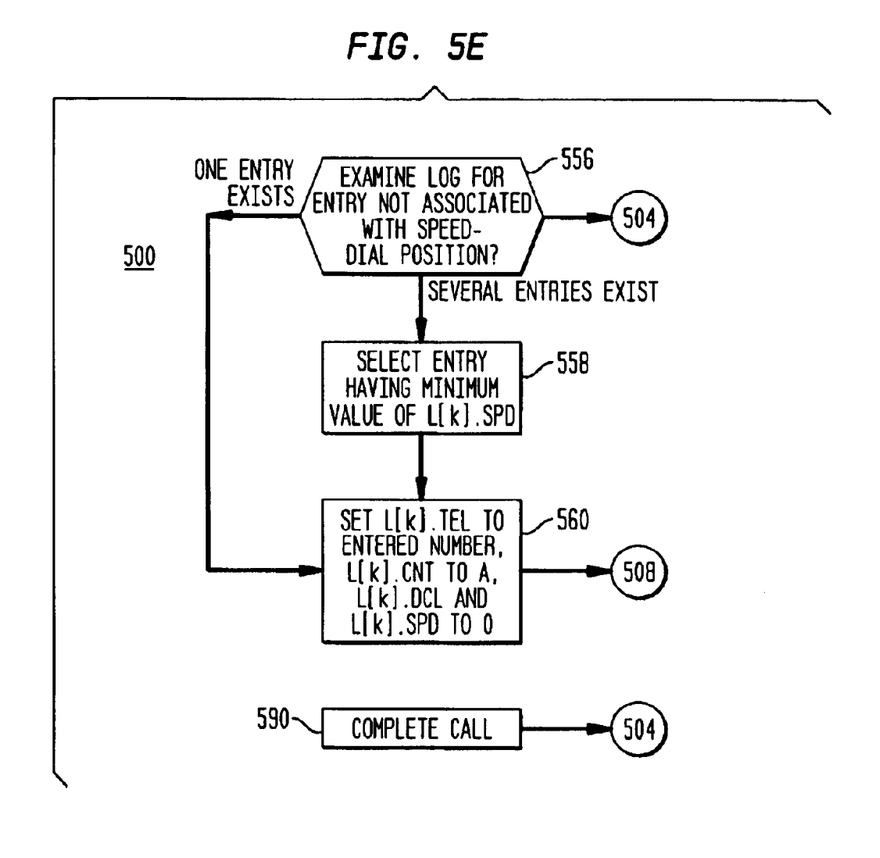

A is chosen in order to establish a criterion for identifying a number as frequently dialed. When the speed-dial list is empty, the criterion for a frequently-dialed number should be relatively easy to meet and A should have a relatively high value. The criterion should grow more difficult to meet as the speed-dial list becomes full, so the value of A should be decreased.

Next, the process proceeds to step 512 and the entry is examined to determine if it is already present in the speed-dial list, that is, if the value of L[k].SPD≠0. If the entered number is present in the speed-dial list, the process proceeds to step 514 and a reminder is displayed or otherwise communicated to the user. The process then proceeds to step 590 and the call is connected. The process then returns to step 504. If the entered number is not present in the speed-dial list, the process proceeds to step 516 and the call is connected.

After the call is connected at step 516, the process proceeds to step 518 and the entered number is examined to determine if it is a candidate for inclusion in the speed-dial list. If the entered number is not a candidate for inclusion, the process returns to step 504. The entered number is a candidate for inclusion if L[k].CNT=M and L[k].SPD=0, that is, the usage frequency is high but the telephone number is not in the speed-dial list, and L[k].DCL<V, that is, the user has declined requests to add the entered number to the speed-dial list less than a predetermined maximum number of times. If more than one candidate for inclusion exists, a candidate is selected for which the value of L[k].DCL is minimal. If a candidate for inclusion has been selected, the process continues to step 520 and the speed-dial list is examined to determine if it contains an empty position. If an empty position s exists in the speed-dial list, the process proceeds to step 522 and the user is prompted to add the entered telephone number to the speed-dial list at the empty position. If the user declines the prompt, the process proceeds to step 524 and the value of L[k].DCL is increased by 1 and the value of L[k].CNT is set to 0. The process then returns to step 504. If the user accepts the prompt, the process skips to step 526 and additional information such as voice or text is requested from the user to be stored along with the entered number. Next, the process proceeds to step 528 and the entered number is stored, along with any additional information provided by the user. At step 530, the value L[k].SPD is set to s and the value of L[k].DCL is set to 0. The process then returns to step 504.

If the speed-dial list is full, the process proceeds to step 532 and a search is made for a speed-dial entry which may be removed. That is, a search is made for a log entry L[j] such that L[j].CNT=0 and L[j].SPD≠0 and L[j].DCL<V. If no such entry exists, the process returns to step 504. If more than one such entry exists, the process proceeds to step 534 and the entry is selected for which L[j].DCL is minimal. Next, the process proceeds to step 536. If exactly one entry exists which can be removed, the process skips to step 536. At step 536, the user is prompted to replace the number L[j].TEL with the number L[k].TEL. If the user accepts, the process proceeds to step 537 and the user is prompted to provide additional information such as a voice or text input to be stored in association with the entered number. The process then proceeds to step 538 and the number L[k].TEL is stored in the speed-dial list position L[j].SPD in association with additional information provided by the user. The process then proceeds to step 540 and L[k].SPD is set to L[j].SPD, L[k].DCL is set to 0, and L[j].SPD and L[j].DCL are set to 0. The process then returns to step 504.

If the user declines to replace the speed-dial entry L[j].TEL, the process proceeds to step 542 and L[j].DCL is increased by 1 and L[j].CNT is set to M. At step 544, the user is prompted to suggest another speed-dial entry to delete. If the user declines to suggest a speed-dial entry to delete, the process proceeds to step 554 and L[k].CNT is set to 0 and L[k].DCL is increased by 1. The process then proceeds to step 504.

If the user accepts and suggests an entry s to delete, the process proceeds to step 546 and the log list is scanned for an entry L[i] such that L[i].SPD =s. If no such entry is found, the process proceeds to step 547 and the user is warned that no entry exists. The process then returns to step 544. If such an entry is found, the process proceeds to step 548 and L[i].SPD and L[i].DCL are set to 0. At step 549, the user is prompted for additional information to associate with the speed-dial entry. At step 550, the number L[k].TEL is stored in the speed-dial list position s. At step 552, L[k].SPD is set to s and L[k].DCL is set to 0. The process then proceeds to step 504.

At step 556, the log is examined for an entry not associated with a speed-dial position, that is, for an entry L[k] such that L[k].CNT=0 and L[k].SPD =0. If there is no such entry, the process returns to step 504. If several such entries exist, the process proceeds to step 558 and the entry L[k] having the maximum value of L[k].SPD is selected. If one such entry exists, the process skips to step 560. At step 560, L[k].TEL is set to the entered number, L[k].CNT is set to A, L[k].DCL is set to 0 and L[k].SPD is set to 0. The process then returns to step 508.

At step 590, the call is connected. After completion of the call, the process returns to step 504.

An examination of the steps above reveals considerations to be taken into account in determining a value for the design parameter A. The CNT field in a log entry L[k] is incremented by A when the corresponding number TEL is dialed, and is decremented by one whenever a different phone number is dialed. Let p be the relative frequency of the number TEL ($0 \leq p \leq 1$), that is, p is the probability that when a number is dialed that number is TEL. The expected increase in the value of CNT whenever a number is dialed is given by pA−(1−p). If this expression is positive the value of CNT will, on average, increase, until it reaches M. If the expression is negative, the value of CNT will, on average, decrease, until it reaches 0. Once the value of CNT reaches M, the user is prompted to add the entered number to the speed-dial list. If there is an open position in the speed-dial memory, this user is prompted to add the entered number to the open position. If there is no open position, the system looks for a position that can be deleted and replaced by the new number, either by suggesting a speed-dial entry which is infrequently used, or by prompting the user to suggest an entry.

If user declined the prompt to add the number to the speed-dial list, CNT is set to zero, and must increase until it reaches M in order to be proposed again as a candidate to the speed-dial list. However, the number of times that the user is prompted to add this number is limited to V. When this limit is reached, the user is no longer prompted to add this number.

In order for the expected increase to be positive, p must satisfy: $p>(A+1)^{-1}$. However since the user dialing pattern is generally random, it is possible that the CNT for an infrequently used number will reach M or that CNT for a frequently used number will decrease to zero. The larger M is, the less likely it is for this to happen. However, for larger values of M it will take longer until the user is prompted to add the number to the speed-dial list.

It will be realized that at any given time there may be no more than (A+1) telephone numbers for which $p>(A+1)^{-1}$ because the sum of probabilities of all telephone numbers equals one. Therefore, if A is set to S-1, it is effectively guaranteed that no more than S telephone numbers will be considered as frequent. Therefore, upon initialization, A should be chosen much larger than S-1 (e.g. by an order of magnitude). Once the speed-dial becomes fully occupied, A should be decreased in order to make the criterion for "frequently dialed" more difficult to meet.

Figure 6:
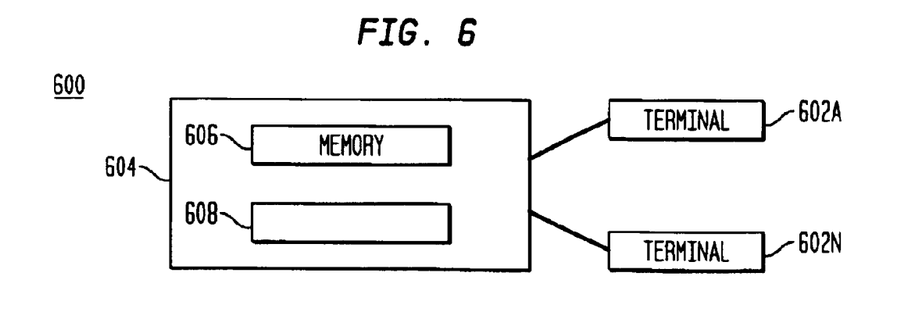
FIG. 6 illustrates a telephone network employing identification and storage of frequently used telephone numbers according to the present invention.

FIG. 6 illustrates a telephone network 600 according to the present invention. The network 600 includes a plurality of telephone terminals 602A . . . 602N communicating with a network server 604. Each of the terminals 602A–602N receives user inputs such as data entries and voice or data communication inputs and transmits the user inputs to the server 604. The server 604 implements communication between terminals, for example connecting a call between the terminals 602A and 602B and transmitting communication data between the terminals 602A and 602B. The server 604 includes a memory 606 for data storage and a processor 608 for processing data and executing commands. The server maintains in the memory 606 a speed-dial list for each of the terminals 602A through 602N, as well as a log of previously entered telephone numbers for each of the terminals 602A through 602N. Each of the speed-dial lists and logs of frequently entered numbers is associated with the appropriate terminal by a code which may be transmitted automatically from the terminal or alternatively entered by a user at the beginning of a call.

The server 604 issues user prompting to add entered numbers to the list according to usage frequency, and to replace less frequently used numbers. When a user enters a telephone number into one of the terminals 602A through 602N, the server 604 identifies candidates for addition to and deletion from the speed-dial list, and provides user prompting, in ways similar to those shown above in the context of integrated telephone applications. The use of the server 604 to perform frequency evaluation and user prompting allows the use of simple terminals, while still making significant processing power and storage capability to the users by centralizing the computations necessary to provide automated user prompting for additions to the speed-dial list.

Figure 7:
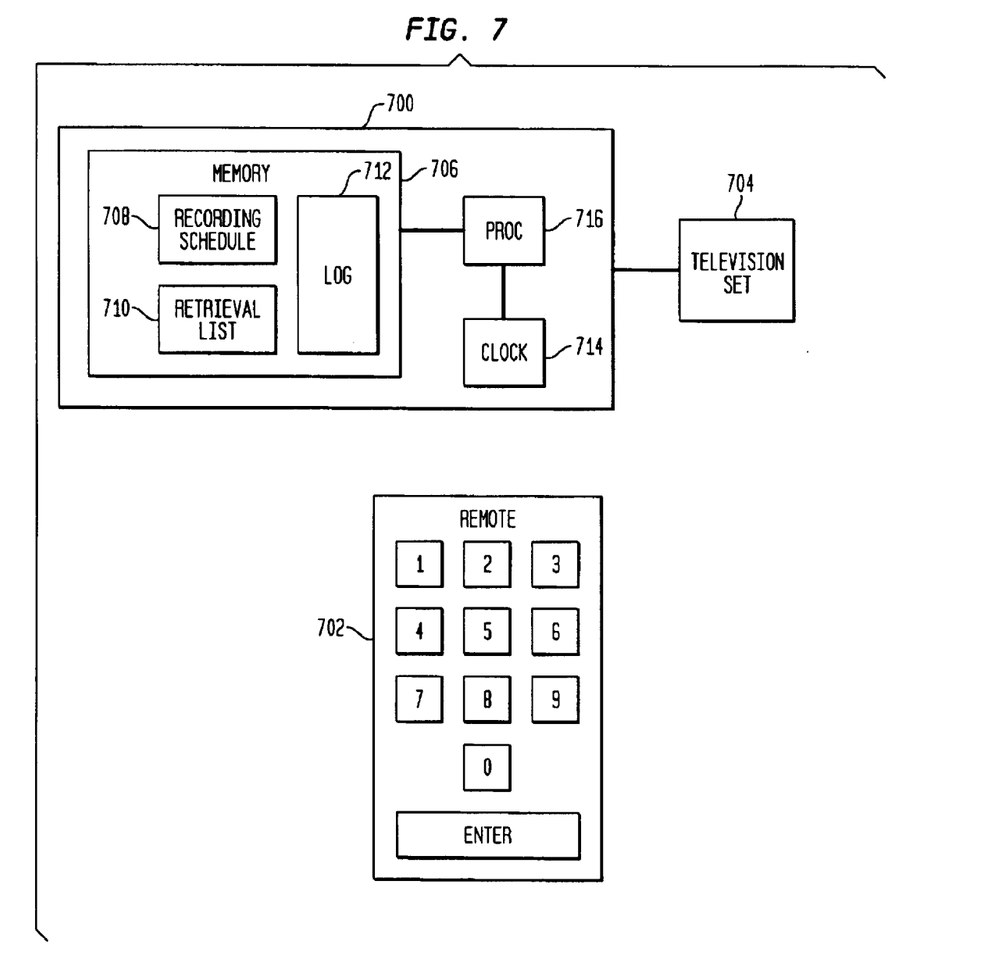
FIG. 7 illustrates a videorecorder employing identification and storage of frequently used programming parameters according to an alternative aspect of the present invention.

It will be readily recognized that the present invention is not limited to applications in telephony. As an example, FIG. 7 illustrates a videorecorder 700 according to an alternative embodiment of the present invention. The videorecorder 700 is designed for unattended recording of television or other broadcasts according to a schedule preset by the user. The videorecorder includes a user entry interface such as a remote control 702, allowing the user to issue commands and programming instructions. The videorecorder also employs a user output interface, in this case a connected television set 704, used for playback of recorded broadcasts and also serving as an information display the videorecorder 700 for providing information and command menus to the customer. The videorecorder 700 also includes storage 706. The storage 706 is used for storing a recording schedule 708, a retrieval list 710 of programming parameters for quick retrieval and entry into the recording schedule, and a log 712 of entered programming parameters, along with the usage frequency of each set of programming parameters. The videorecorder 700 also includes a clock 714 for use in recording operations. The clock 714 may also be used to evaluate the frequency with which each set of programming parameters is entered. The videorecorder 700 also includes a processor 716 for controlling the operations of the videorecorder 700 and for evaluating entries for addition to the retrieval list 710.

When a user wishes to add a set of programming parameters to the recording schedule 708, he or she makes an entry using the remote control 702. Each time a set of programming parameters is entered, the processor 716 compares the set of parameters with the retrieval list 710 to determine if the set of parameters is already in the retrieval list 710. If the set of programing parameters is in the retrieval list 710, a reminder is displayed. The set of programming parameters is then added to the recording schedule 708.

If the set of programming parameters is not in the retrieval list 710, the processor 716 examines the log 712 to determine if the set of parameters is already in the log. If yes, the usage frequency is updated. If no, the set of parameters is added to the log 712 and assigned an initial usage frequency. The processor 716 then examines the usage frequency of the set of parameters to determine if it meets a predetermined criterion. If the set of parameters does not meet the criterion, the programming operation ends. If the set of parameters does meet the criterion, it is a candidate for inclusion in the retrieval list 710 and the processor 716 orders a prompt to be displayed prompting the user to add the set of parameters to the retrieval list 710. If the user accepts the prompt, the set of parameters is added to the retrieval list 710. If the user declines, the set of parameters is not added.

While the present invention is disclosed in the context of a presently preferred embodiment, it will be recognized that a wide variety of implementations may be employed by persons of ordinary skill in the art consistent with the above discussion and the claims which follow below. It will be further recognized that the scope of the present invention is not limited to telephony or videorecording, but may be employed in any desired system to store data items in a retrieval list for later recall and use.

I claim:

1. A method of evaluation and user prompting for storage of frequently-used telephone numbers into a speed-dial list, comprising the steps of:

receiving an entry of a telephone number;

determining the usage frequency of the entered telephone number;

determining if the entered telephone number appears in the speed-dial list;

if the entered telephone number does not appear in the speed-dial list, comparing the usage frequency of the entered telephone number against a predetermined criterion, the criterion being set so as to be relatively easy to meet if a large proportion of the speed-dial list is unoccupied, the criterion being set so as to be progressively more difficult to meet as the unoccupied proportion of the speed-dial list decreases;

if the entered telephone number meets the predetermined criterion and does not appear in the speed-dial list, prompting the user to determine if the entered number should be stored in a speed-dial list unless the user has already declined a prompt for the entered number more than a predetermined number of times; and if the user directs storage of the entered number, storing the entered number in the speed-dial list.

2. The method of claim 1 wherein the step of receiving the entry of the telephone number is followed by a step of comparing the entered telephone number against a log of previously entered numbers, updating a stored usage frequency of the entered number if the entered number appears in the list of stored numbers, and storing the entered number along with an initial usage frequency, if the entered number does not appear in the list of stored numbers.

3. The method of claim 2 wherein the step of determining the usage frequency of the entered number involves retrieving the usage frequency of the entered number as stored in the log.

4. The method of claim 3 wherein the step of comparing the usage frequency against a predetermined criterion is followed by a step of determining if empty space exists in the speed-dial list.

5. The method of claim 4 wherein if empty space does not exist in the speed-dial list, the user is prompted to store the entered number in the speed-dial list only if a candidate for replacement exists having a usage frequency less than the usage frequency of the entered number.

6. The method of claim 5 wherein if the entered number does appear in the speed-dial list, the user is reminded that the entered number already exists in the speed-dial list.

7. The method of claim 6 wherein the usage frequency is calculated by making computations to perform a relative usage frequency comparison between the entered number and previously entered numbers.

8. The method of claim 7 wherein further computations are made to perform a relative usage frequency comparison between the entered number and presently-existing speed-dial list entries.

9. The method of claim 5 wherein an existing entry in the speed-dial list is not prompted for deletion if the user has already declined a prompt for deletion of the entry more than a predetermined number of times.

10. The method of claim 9 wherein the user is prompted to suggest a speed-dial entry for deletion if the user declines a prompt to delete an existing speed-dial entry.

11. A method of evaluation and user prompting for storage of frequently-used telephone numbers into a speed-dial list, comprising the steps of:

receiving an entry of a telephone number;

comparing the entered telephone number against a log of previously entered numbers;

updating a stored usage frequency of the entered number if the entered number appears in the list of stored numbers;

storing the entered number along with an initial usage frequency, if the entered number does not appear in the list of stored numbers;

retrieving the usage frequency of the entered number as stored in the log in order to determine the usage frequency of the entered telephone number;

determining if the entered telephone number appears in the speed-dial list;

if the entered telephone number does not appear in the speed-dial list, comparing the usage frequency of the entered telephone number against a predetermined criterion;

determining if empty space exists in the speed-dial list;

if the entered telephone number meets the predetermined criterion and does not appear in the speed-dial list, and if empty space exists in the speed-dial list or a number exists in the speed-dial list having a lower usage frequency than the entered number, and the user has not declined a prompt to add the entered number to the speed-dial list more than a predetermined number of times, prompting the user to determine if the entered number should be stored in the speed-dial list; and if the user directs storage of the entered number, storing the entered number in the speed-dial list.

12. The method of claim 11 wherein an existing entry in the speed-dial list is not prompted for deletion if the user has already declined a prompt for deletion of the entry more than a predetermined number of times.

13. The method of claim 12 wherein the user is prompted to suggest a speed-dial entry for deletion if the user declines a prompt to delete an existing speed-dial entry.

* * * * *